United States Patent [19]

Jackson

[11] Patent Number: 4,889,629
[45] Date of Patent: Dec. 26, 1989

[54] FILTER PANEL WITH PARALLEL PASSAGES AND MECHANICAL FILTER SCREEN COMPRISING SAME

[75] Inventor: Philip Jackson, Paris, France

[73] Assignee: E. Beaudrey & Cie, Paris, France

[21] Appl. No.: 143,528

[22] Filed: Jan. 13, 1988

[30] Foreign Application Priority Data

Jan. 16, 1987 [FR] France .................. 8700429

[51] Int. Cl.⁴ .................. B01D 25/08; B01D 33/02
[52] U.S. Cl. .................. 210/401; 210/402; 210/498; 210/510.1; 55/521; 55/529
[58] Field of Search ............ 210/494.3, 497.03, 493.1, 210/494.1, 400, 401, 402, 404, 397, 498, 499, 510.1; 55/500, 521, 523, 529

[56] References Cited

U.S. PATENT DOCUMENTS

| | | | |
|---|---|---|---|
| 3,590,453 | 7/1971 | Bryand | 29/121 |
| 3,850,804 | 11/1974 | Taylor et al. | 210/155 |
| 4,288,330 | 9/1981 | Strub | 210/777 |
| 4,441,999 | 4/1984 | Frykhult | 210/402 |
| 4,447,324 | 5/1984 | Jackson | 210/159 |
| 4,814,076 | 3/1989 | Jackson | 210/397 |

FOREIGN PATENT DOCUMENTS

| | | |
|---|---|---|
| 1182551 | 1/1959 | France . |
| 1325859 | 3/1963 | France . |
| 683547 | 12/1952 | United Kingdom . |
| 995620 | 6/1965 | United Kingdom . |
| 1019726 | 2/1966 | United Kingdom . |
| 1083770 | 9/1967 | United Kingdom . |
| 1350776 | 4/1974 | United Kingdom . |
| 1489838 | 10/1977 | United Kingdom . |

Primary Examiner—W. Gary Jones
Assistant Examiner—Wanda L. Millard
Attorney, Agent, or Firm—Charles E. Brown; Charles A. Brown

[57] ABSTRACT

A filter panel comprises a plurality of substantially coplanar openings. It incorporates a two-dimensional array of parallel elongate passages. Each passage delimits a respective one of the openings. The array is substantially coplanar with the openings and the passages are substantially perpendicular to the array. Each opening is convergent from an interior profile both from the inlet and outlet side of the panel.

13 Claims, 1 Drawing Sheet

U.S. Patent  Dec. 26, 1989  4,889,629
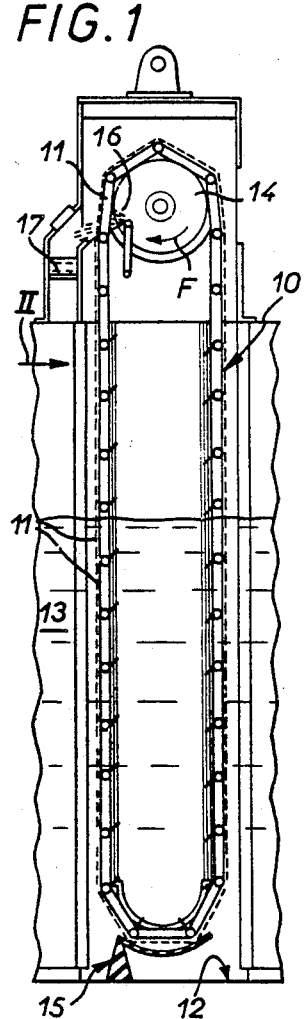
FIG.1
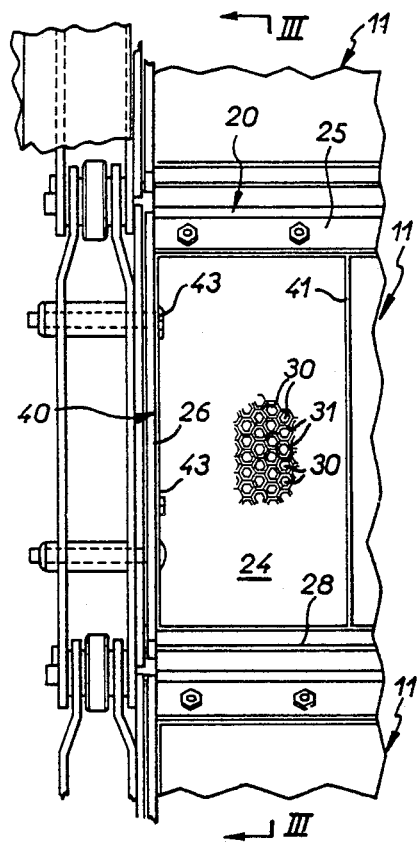
FIG.2
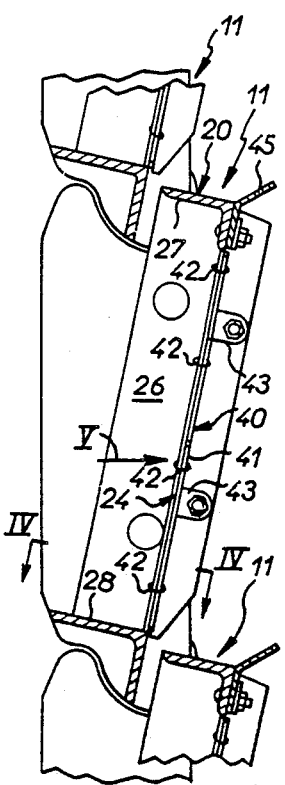
FIG.3
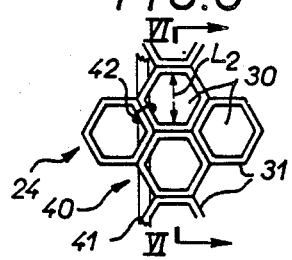
FIG.5   FIG.6   FIG.7   FIG.9
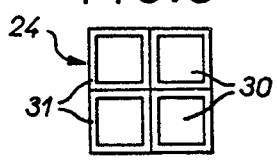
FIG.8
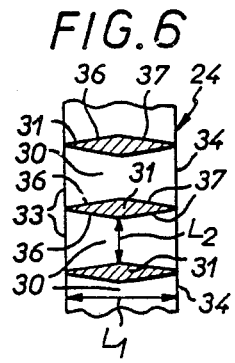
FIG.4
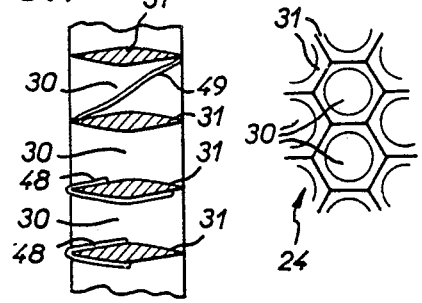

FILTER PANEL WITH PARALLEL PASSAGES AND MECHANICAL FILTER SCREEN COMPRISING SAME

BACKGROUND OF THE INVENTION

1. Field of the invention

The present invention is generally concerned with mechanical filter screens designed to separate out from flowing water debris or waste materials carried by the latter.

These may be mobile filters, for example chain filters by which is meant filters in which the filter cloth moves in a closed loop or drum filters by which is meant filters in which the filter member is a rotating drum, or static filters such as those designed to be inserted into a pipeline, for example.

2. Description of the prior art

A common feature of such screens or filters is the use of one or more filter panels that the water to be treated has to pass through, the filter panel or panels comprising to this end appropriately sized openings.

At present such filter panels are generally two-dimensional, whether they are of mesh form, for example metal mesh with braided or welded wires, or of perforated sheet metal.

In other words, in the direction perpendicular to the plane of their openings they have no significant dimension other than that necessary to confer on them the appropriate mechanical strength.

Holding back debris or waste materials carried by the water flowing through them, they are progressively clogged by the latter, to the detriment of their overall effectiveness.

It is therefore necessary to clean them systematically or periodically.

In practise, such cleaning is done by passing water through them in the opposite direction: in the case of washing in air water jets are specifically employed for this purpose, whereas in the case of cleaning under water the direction of flow of the water is reversed by means of a suction arrangement.

The debris or waste materials previously held back by a filter panel are more easily removed by such counter-current circulation of water if they are not strongly adherent to the filter panel.

Strong adherence is often found in practise, however, and may be explained by either of the following processes or a combination of them both.

In the first process, when a long, thin and relatively rigid item such as a pine needle, for example, enters an opening or mesh in the filter panel through which it has to pass, it may be inclined relative to the plane of the opening and lie across the opening, so blocking it, in particular where the opening has a contour with corners as is the case with woven or welded metal mesh; there is in fact a natural predisposition for such jamming to occur, or even a wedging effect between two wires where they cross over.

In this case the counter-current circulation of water for cleaning serves only to press such debris or waste materials against the filter element, as they have already passed part-way through the filter panel and are locally jammed or wedged into it. The end result is that they cannot be detached from it by this means.

Thus such debris or waste materials are not removed, which is the opposite of the required effect.

In the second adhesion process that may be operative, flexible fibers of greater or lesser length carried in the flow of water to be treated "straddle" the solid members (wires, bars or the like) delimiting the openings in a filter panel; these may be textile fibers or other items similar to such fibers, for example certain filament-shaped algae or plant leaves in a relatively advanced state of decomposition.

Because of the turbulence that is inevitable on passing through a filter panel and because of the counter-current flow of water that occurs on reversing the flow for cleaning, a fiber of this kind may become wrapped around a solid member of this kind or may become tied into a knot on the far side of it; this possibility is facilitated in that, as already mentioned, the solid member concerned has no significant thickness with the result that fibers can easily have a length twice this thickness and therefore quite sufficient for the wrapping or knotting process in question to occur.

In either case, the counter-current circulation during cleaning may not suffice to detach from the filter panel the flexible fibers that it has held back, which leads by a progressive process often referred to as "felting" to more or less complete obstruction of the filter panel.

A third possible adhesion process concerns viscous bodies such as jellyfish or debris from such aquatic animals.

Held back by a filter panel, any such viscous body inevitably blocks one or more openings therein.

Because of the thrust on it due to the head loss that occurs on passing through the filter panel, it is deformed and at least part of it enters into the relevant opening in the filter panel; once it has passed through, it tends to resume its initial configuration, with average transverse dimensions greater than the average width of the opening.

It therefore forms, beyond the filter panel, a swelling resembling in some ways a rivet head.

As previously, the counter-current flow during cleaning is unable to push back this swelling and therefore cannot detach the viscous body concerned from the filter panel.

A general object of the present invention is an arrangement adapted to minimize or even eliminate totally the possibility of adhesion resulting from such processes.

SUMMARY OF THE INVENTION

The invention consists in a filter panel comprising a plurality of openings and a substantially rigid, generally coplanar array of parallel passages, each of the passages defining a respective one of the openings, the passages being elongate and having a substantial dimension perpendicular to the general plane of the array.

In another aspect, the invention consists in a mechanical filter screen employing one or more filter panels as defined in the preceding paragraph.

In outline, rather than extending in only two dimensions, those of the plane defined by its openings, the filter panel in accordance with the invention is three-dimensional, having significant thickness perpendicular to this plane, with, in practise, a honeycomb type structure.

A notable result of this is that any such long, thin and relatively rigid piece of debris or waste that enters into any of the passages delimiting the openings cannot become strongly inclined to the passage because of the inherent length thereof and so has little chance of becoming jammed in it.

As the passages of the filter panel in accordance with the invention preferably have a hydrodynamic profile and as the panel is preferably molded from a synthetic material, it does not of itself have any shape features favoring such jamming or clamping.

Moreover, given the inherent length of the passages in the filter panel in accordance with the invention, there is not much chance that any flexible fiber encountering any of the solid parts delimiting these passages could be of sufficient length to wind itself around any such massive part or to knot itself beyond the latter.

The passages of themselves reduce to some degree the turbulence of the water passing through them, such turbulence favoring the wrapping or knotting process in question and usually occurring on passage through a filter panel.

If a viscous body should, by deforming, enter any of the passages characteristic of the filter panel in accordance with the invention, given the length of any such passage and the resistance to movement along it, its is unlikely that any such viscous body could exit the passage on the opposite side of the filter panel and spread out beyond this.

The counter-current flow for cleaning is sufficient to expel any such viscous body from any such passage, such expulsion being made easier in that, as already mentioned, the passages in the filter panel in accordance with the invention are preferably and advantageously hydrodynamically profiled.

To summarize, with the filter panel in accordance with the invention the risk of adhesion of any debris or waste material is minimized and should any such adhesion occur temporarily there is every chance that it will be eliminated by cleaning through counter-current circulation of water, the corresponding detaching of the debris and waste material enabling them to be eliminated as required and in the usual way.

In the case of a moving filter, when a filter panel in accordance with the invention emerges from the water there may be some retention of water in its passages and the progressive draining off of the filter panel may result in some degree of washing of the subsequent filter panel in itself sufficient to detach prematurely from this latter filter panel any debris or waste materials entrained by it.

In accordance with the invention, to circumvent this drawback, there is preferably associated with each of the filter panels that a mechanical filter screen of this type comprises, along the leading edge of the filter panel relative to its direction of movement, a deflector which extends generally towards the interior of the filter member or cloth of which the filter panel forms part.

Opposing washing down of the filter panel with which it is associated, this deflector secures proper entrainment by the latter of debris and waste materials that it has previously held back.

The characteristics and advantages of the invention will emerge from the following description given by way of example with reference to the appended schematic drawings.

BRIEF DESCRIPTION OF THE DRAWINGS

FIG. 1 is a side view in elevation of a mechanical filter screen, in this instance of a chain filter, using filter panels in accordance with the invention.

FIG. 2 is a partial front view in elevation and to a larger scale of the mechanical filter screen as seen in the direction of the arrow II in FIG. 1.

FIG. 3 is a partial view of it in longitudinal cross-section on the line III—III in FIG. 3.

FIG. 4 is a partial view of it in transverse cross-section on the line IV—IV in FIG. 3.

FIG. 5 is a partial plan view to a still larger scale of one of the filter panels equipping this mechanical filter screen, as seen in the direction of the arrow V in FIG. 3.

FIG. 6 is a view of this filter panel in axial cross-section on the line VI—VI in FIG. 5 and to a scale slightly greater than that of FIG. 5.

FIG. 7 is a view analogous to that of FIG. 6 showing the process whereby the filter panel in accordance with the invention contributes to minimizing the possibility of any debris or waste materials adhering to a filter panel of this kind.

FIGS. 8 and 9 are plan views analogous to that of FIG. 5 and each relating to a respective alternative embodiment of the invention.

DESCRIPTION OF THE PREFERRED EMBODIMENTS

These figures show by way of example the application of the invention to a chain filter, that is to say a filter or screen comprising a filter cloth 10 formed from a succession of filter elements 11 articulated two by two in the same way as the links of a chain, arranged to move in an endless loop.

In the embodiment shown in FIG. 1, the filter cloth 10 extends vertically through a channel 12 in which flows water 13 to be treated, the flow of which it intercepts. Suspended by its upper part, which is out of the water, from a driving wheel 14, it cooperates in its lower part with sealing means 15.

The flow of water 13 to be treated therefore passes in succession through both runs of the filter cloth 10, from the outside to the inside through the first or upstream run, and from the inside to the outside through the second or downstream run.

The direction of rotation of the driving wheel 14 as shown by an arrow F in FIG. 1 is such that the upstream run moves upwards entraining with it debris and waste materials which, carried by the flow of water 13 be treated, are held back by the filter elements 11 constituting it.

In the upper part of this upstream run, above the water surface, there is a cleaning device adapted to detach from the filter elements 11 the debris and waste materials previously held back by them.

A washing device 16 disposed inside the filter cloth 10 sprays a jet of water onto the filter elements 11 of the latter as they pass by and the debris and waste materials detached from the successive filter elements 11 are collected in a take-off channel 17.

These arrangements are well known in themselves and as they do not form any part of the present invention they will not be described in more detail here.

Only those elements necessary to an understanding of the invention will be described here.

Suffice to say that, as clearly seen in FIGS. 1 through 4, each of the filter elements 11 comprises a chassis 20 on the sides of which are rotatably mounted rollers 21 adapted to guide the assembly by engaging with a fixed track 22 provided to this end on a frame 23 attached to the sides of the channel 12 concerned, and a filter panel 24 carried by the chassis 20.

The chassis 20 is formed by two side flanges 26 and upper and lower angle-irons 27, 28 welded to the side flanges 26.

In the known way, the filter panel 24 forming the active part of a filter element 11 comprises a plurality of openings 30.

These openings 30 may be regarded as coplanar, the plane in which they lie being defined as the median plane of the assembly.

In accordance with the invention, the openings 30 are each individually delimited by parallel channels 31 constituting a substantially rigid, non-articulated two-dimensional array generally in the plane of the openings and having a significant length in the direction perpendicular to this plane.

As the passages 31 are contiguous the overall structure of the filter panel 24 in accordance with the invention is of the honeycomb type.

In the embodiment shown in FIGS. 1 through 7 the openings 30 which delimit the passages 31 have a hexagonal contour which reflects a good compromise between the quantity of material used to make such passages and the passage cross-section offered by the openings and which also results in the contour of the openings having only obtuse angles unlikely to favor any jamming of debris or waste material.

As alternatives to this, however, the contour of the openings 30 may equally well be square (FIG. 8) or circular (FIG. 9), for example.

All the openings 30 in a given filter panel 24 have the same contour and the same passage cross-section and the passages 31 which delimit them are placed one against another in such a way as to minimize dead areas.

In any event, the wall thickness of the passages at the inlet and outlet is substantially smaller than the average width of the openings as illustrated in any of FIGS. 5–9.

In the case of a hexagonal or square contour they lie against each other through the whole of one side.

The passages 31 have from their inlet 33 to their outlet 34 a length Ll which is preferably at least equal to the average width L2 of the openings 30 that they delimit, the latter being taken as defined by their median area between their inlet 33 and their outlet 34.

In the case of hexagonal contour openings 30, for example, this average width L2 may be taken as the diameter of the circle inscribed inside this contour.

In any event, the length Ll is preferably chosen according to that of the debris or waste materials such as fibers to be held back.

The passages 31 delimiting the openings 30 are also appropriately profiled.

They comprise over part of their length from the inlet 33 a convergent section 36 and over part of their length towards the outlet 34 a divergent section 37.

In other words, each of the passages 31 forms a venturi the throat in which constitutes the corresponding opening 30.

This throat is at the mid-length position.

The filter panel 24 is symmetrical relative to the plane which constitutes its median plane perpendicular to the lengthwise direction of the passages 31 delimiting its openings 30, that is to say relative to the plane of the latter.

Either side may therefore be used.

This is not necessarily the case, however.

Depending on the application, the length of the convergent portion 36 inside the passages 31 may be greater than or less than the length of the divergent portion 37 following on from the convergent portion 36.

The solid parts delimiting the passages 31 may be hydrodynamically profiled, to a droplet shape, for example.

The filter panel 24 is advantageously molded in one piece from a synthetic material, the angles that have to be provided to facilitate removing any such synthetic material from the mold advantageously of themselves contributing to the formation of convergent and divergent passage sections.

As an alternative to this, however, it is equally possible to make a filter panel of this kind in metal, for example by dip soldering appropriately pre-shaped metal elements.

In all these cases, hydrodynamic profiling of the passages 31 has the advantage of favoring the minimizing of head losses.

With the same objective in view, any edges that they feature are preferably rounded off to a hydrodynamic shape by fillets.

The filter panel 24 of each filter element 11 is held in position and braced by a frame 40 to which it is appropriately attached.

The frame comprises spaced bars 41 extending between two opposite sides and, spaced along each of the bars 41, clips 42 which extend around the bar 41 and pass through openings 30 in the filter panel 24, that is through the passages 31 delimiting the openings 30.

The frame 40 has lugs 43 at the side by means of which it is attached to the corresponding chassis 20.

As an alternative to this, the filter panel 24 could be self-supporting and fitted direct to the chassis 20.

Along the leading edge of each filter panel 20 relative to the direction in which it moves, that is to say relative to the direction of movement of the filter cloth 10 of which it forms part, is a deflector 45 extending obliquely towards the interior of the filter cloth 10.

The deflector 45 is bolted to the corresponding upper angle-iron 27 of the chassis 20.

If, as shown in FIG. 7, any fiber 48 should straddle the passages 31 delimiting the opening 30 in the filter panel 24, the length of the passages 31 means that there is little chance that it could wrap around the passage 31 or knot itself beyond the latter.

Similarly, the inclination that any thin and rigid element 49 could adopt inside a passage 31 is too small, given the length of the passage, for it to become jammed in the passage 31.

The deflector 45 associated with each filter panel 24 cooperates with the corresponding upper angle-iron 27 to protect it from the washing effect to which it would otherwise be subjected by the filter panel 24 of the preceding filter element 11 as a result of water temporarily retained in the passages 31 of the latter by capillary action running out.

It is to be understood that the present invention is not limited to the embodiments described and shown, but encompasses any variant execution thereof.

Also, applications of the invention are not limited to chain filters only, but encompass any form of mechanical filter or screen.

THERE IS CLAIMED:

1. A filter panel comprising a plurality of openings and a substantially rigid, generally coplanar array of parallel passages, each of said passages delimiting a respective one of said openings, said passages being elongate and having a substantial dimension perpendicular to the general plane of said array, each of said passages having an inlet and an outlet, the passages having a wall thickness at the inlet and outlet substantially smaller than an average width of the openings, the passages delimiting said openings having a convergent interior profile from their inlet towards their outlet and a convergent interior profile from their outlet towards their inlet.

2. A filter panel according to claim 1, wherein said passages defining said openings have a length at least equal to the average width of said openings.

3. A filter panel according to claim 1, wherein said passages defining said openings are contiguous in a honeycomb-type structure.

4. A filter panel according to claim 1, wherein said filter panel is made from a synthetic material.

5. A filter panel according to claim 1, wherein said array is of one-piece construction.

6. A mechanical filter screen comprising at least one filter panel comprising a plurality of openings and a substantially rigid, generally coplanar array of parallel passages, each of said passages delimiting a respective one of said openings, said passages being elongate and having a substantial dimension perpendicular to the general plane of said array, each of said passages having an inlet and an outlet, the passages having a wall thickness of at the inlet and outlet substantially smaller than an average width of the openings, the passages delimiting said openings having a convergent interior profile from their inlet towards their outlet and a convergent interior profile from their outlet towards their inlet.

7. A mechanical filter screen according to claim 6, wherein said passages delimiting said openings have a length at least equal to the average width of said openings.

8. A mechanical filter screen according to claim 6, wherein said passages delimiting said openings are contiguous in a honeycomb-type structure.

9. A mechanical filter screen according to claim 6, wherein said filter panel is made from a synthetic material.

10. A mechanical filter screen according to claim 6, comprising a frame which supports and braces said filter panel and to which said filter panel is attached.

11. A mechanical filter screen according to claim 6, wherein said filter panel is self supporting.

12. A mechanical filter screen according to claim 6, wherein said array is of one-piece construction.

13. A mechanical filter screen comprising a mobile filter member formed by a succession of filter panels, and associated with each filter panel, along a leading edge thereof relative to its direction of movement, a deflector extending generally towards an interior of the filter member, each of said filter panels comprising a plurality of openings and a substantially rigid, generally coplanar array of parallel passages, each of said passages delimiting a respective one of said openings, said passages being elongate and having a substantial dimension perpendicular to the general plane of said array, each of said passages having an inlet and an outlet, the passages having a wall thickness of at the inlet and outlet substantially smaller than an average width of the openings, the passages delimiting said openings having a convergent interior profile from their inlet towards their outlet and a convergent interior profile from their outlet towards their inlet.

* * * * *